United States Patent
Schwartze et al.

(10) Patent No.: US 10,721,355 B2
(45) Date of Patent: Jul. 21, 2020

(54) METHOD FOR OPERATING A COMMUNICATION SYSTEM, TELECOMMUNICATION APPARATUS AND COMPUTER PROGRAM PRODUCT

(71) Applicant: Unify Patente GmbH & Co. KG, Munich (DE)

(72) Inventors: Juergen Schwartze, Schwerte (DE); Claus Rist, Bochum (DE)

(73) Assignee: Unify Patente GmbH & Co. KG, Munich (DE)

( * ) Notice: Subject to any disclaimer, the term of this patent is extended or adjusted under 35 U.S.C. 154(b) by 0 days.

(21) Appl. No.: 16/489,816

(22) PCT Filed: Mar. 28, 2018

(86) PCT No.: PCT/EP2018/057996
§ 371 (c)(1),
(2) Date: Aug. 29, 2019

(87) PCT Pub. No.: WO2018/178190
PCT Pub. Date: Oct. 4, 2018

(65) Prior Publication Data
US 2020/0014796 A1    Jan. 9, 2020

(30) Foreign Application Priority Data
Mar. 31, 2017 (DE) ........................ 10 2017 106 958

(51) Int. Cl.
*H04M 3/42* (2006.01)
*H04M 7/00* (2006.01)
*H04W 4/16* (2009.01)

(52) U.S. Cl.
CPC ..... *H04M 3/42365* (2013.01); *H04M 7/0012* (2013.01); *H04W 4/16* (2013.01)

(58) Field of Classification Search
CPC .. H04M 3/42365; H04M 7/0012; H04W 4/16
USPC ....................................... 455/414.1
See application file for complete search history.

(56) References Cited

U.S. PATENT DOCUMENTS

| | | | |
|---|---|---|---|
| 8,503,318 B2* | 8/2013 | Leung | H04L 41/5009 370/252 |
| 9,565,576 B2* | 2/2017 | Tofighbakhsh | H04W 24/02 |
| 10,070,257 B2* | 9/2018 | Mori | H04W 8/186 |
| 2008/0078189 A1* | 4/2008 | Ando | F25B 49/00 62/55.5 |

FOREIGN PATENT DOCUMENTS

| | | |
|---|---|---|
| EP | 2166733 A1 | 3/2010 |
| WO | 2008117116 A2 | 10/2008 |

OTHER PUBLICATIONS

International Search Report for PCT/EP2018/057996 dated Jul. 13, 2018.

* cited by examiner

*Primary Examiner* — Amancio Gonzalez
(74) *Attorney, Agent, or Firm* — Buchanan Ingersoll & Rooney PC

(57) ABSTRACT

If telecommunication devices in a group are associated with different network technologies, a use status of one telecommunication terminal in the group is still transmitted to a second telecommunication terminal of the group. Thus, for example, a busy signal is output by one device of the group even if the telephone call is conducted using another telecommunication terminal of the group.

12 Claims, 6 Drawing Sheets

METHOD FOR OPERATING A COMMUNICATION SYSTEM, TELECOMMUNICATION APPARATUS AND COMPUTER PROGRAM PRODUCT

CROSS-REFERENCE TO RELATED APPLICATIONS

The present application is the U.S. national stage application of International Patent Application No. PCT/EP2018/057996, which claims priority to German Patent Application No. DE 10 2017 106 958.5, filed on Mar. 31, 2017.

FIELD

The invention concerns a method for operating a communication system as well as two types of communication apparatuses and the associated computer program products which can be used to implement the method.

In particular, embodiments of the invention can include a method for operating a communication system that has a group of telecommunications terminals as well as additional telecommunications terminals. The group, which can also be called a device group, has a first telecommunications terminal, which can be operated using a first network technology in a first network system. The "network system," in which a first network technology (standard) is used, is understood to be particularly a communications domain. The network technology is primarily defined by the type of signals—how they are emitted and transmitted—but also by the data formats transmitted. Examples are the transmission of compressed audio files in a GSM domain or transmission of high quality audio and video signals in a social real-time collaboration system. The group of telecommunications terminals has a second telecommunication terminal that can be operated using a second network technology in a second network system (or domain), whereby the second network technology differs from the first network technology (i.e., the domains can be different from each other, which can also be described as the second network system having a environment that is heterogeneous to the first network system and vice versa). Furthermore, the first network system and the second network system are connected via a network interface apparatus, for example, a gateway.

Embodiments of the invention can be suitable for the situation in which the group of telecommunication terminals is assigned to a single subscriber. A subscriber in terms of this application is a user or operator of any type of communication form, meaning chat, email exchange, etc. in addition to telephony. For example, the subscriber may firstly have a land-line connection and secondly a cellular telephone. Thirdly, the user may also have a terminal in a standardized communication system, which connects to communication terminals in a standardized user environment. Such systems are also known as a "Unified Communications Domain." Fourthly, he may also have a telecommunication terminal in a social real-time collaboration system, for example, as known to the applicant under the "Circuit®" proprietary name; see the website www.circuit-.com retrievable on Feb. 20, 2017.

BACKGROUND

A social real-time collaboration system (also called social collaboration system) is a system in which different devices or terminations for different types of communication are synchronized, in which corresponding signaling occurs between the devices. Within the social real-time collaboration systems, like in the "Circuit®" system, in particular multiple terminals belonging to the same user are linked together for communication. In this way, the user can chat and telephone simultaneously (parallel), or data can be transmitted in part via a desk telephone belonging to the social real-time collaboration system on one hand and via a personal computer connected in parallel on the other hand. It is characteristic of the centralization of these participants under one system that such advantages are provided by means of synchronization between the terminals. Such synchronization is not known in an open environment (heterogeneous environment), that is, if two different network systems that work with different network technologies are connected.

In everyday communications, often a first person would like to call a second person and first attempts it using the landline telephone. At the same time, the other person is using the cellular network to telephone a third person, so the person calling on the landline does not notice this. Instead it will just go unanswered. If necessary, the caller will attempt the cellular telephone as an alternative, and find out only then that it is busy.

SUMMARY

From the field of unified communications systems, which connects communication terminals in a uniform user environment (unified communications domains), status information is known to be exchanged within the system in regard to a status defined by the user.

The object of the present invention is to show a way that communication in heterogeneous environments can occur more efficiently.

The objective is achieved in a first aspect by a method for operating a communication system, solved in another aspect by a telecommunications apparatus (e.g. a telecommunications terminal), and achieved in a further aspect by a computer program product with data for a computer program, particularly for a software application stored on a non-transitory computer readable medium that defines a method that is executable by a computer device having a processor that executes the code of the software application.

Embodiments of the method can be characterized in that a use status (or communication status) of the first communication terminal is transmitted to a connection apparatus in the second network system. The use status is designated here by a traffic-carrying state of the telecommunication terminal and is a status inherent to the device, which is ascertainable accordingly by data processing equipment in binary data units (bits) and automatically generated by the operation or use of the telecommunication terminal. During a communication activity by or to a third communication terminal outside of the group, which is used to generate a communication connection between the third and the second telecommunication terminals or to end such a connection, or to expand such a communication connection to at least one additional subscriber, the connection equipment in the second network system defines a communication response depending on the transmitted use status of the first communication terminal and issues it to the third communication terminal. To this end, the traffic-carrying state (for example, in use or free) of the first telecommunication terminal is transmitted to the connection equipment so that the third communication terminal that is calling the second telecommunication terminal—which is also assigned to the same subscriber as the first telecommunication terminal—can be informed accordingly of the traffic-carrying status transmitted by the first telecommunication terminal. As described below, this then can likewise occur as a busy signal, if the first telecommunication terminal is in use. Alternatively or in addition, a reaction is effected by the second telecommunication terminal depending on the use status transmitted by the first telecommunication terminal.

In other words, a person with the third telecommunication terminal calls a user on his second communication terminal and the caller receives a communication response that informs him in an appropriate manner about the use status of the same user on his first telecommunication terminal. For example, an acoustic busy signal can be issued to each caller, including when the telecommunication terminal called directly is not itself in use, but rather the same user's other telecommunication terminal (that is, from the same group) is being used.

Alternatively or in addition, the person being called on the other telecommunication terminal, which is not being called, but on which he is conducting a telephone call with a third person, can be signaled that there was a call. These call waiting functions are generally available on both desk telephones and cellular telephone, but previously only for a call on the same device. They are also called "camp-on." They include lighting a light, emitting a brief acoustic signal or a change in the volume of the telephone call directly in progress, vibration of the telephone or telephone earphone and the like.

In a preferred embodiment of the invention, the first and the second network system are two different network systems from the group of network system types that consists of:

a) a unified communication system, which connects communication terminals in a uniform application environment, b) a cellular network, c) a telephone switchboard, in particular a private branch exchange system or private automatic branch exchange system, or d) a social real-time collaboration system.

In principle, two network systems of the same network type can be connected, provided the technology is different. Preferably however, the two different networks also belong to two different network types from among types a), b), c) and d).

Embodiments of the method preferably provides that, in cases in which the second network system is a telephone switchboard, the connection equipment of said switchboard is a proxy server. In cases in which the second network system is a telephone switchboard, the connection equipment can alternatively be a server that provides communication connections. In cases in which the second network is a cellular network, the connection equipment of the second telecommunication terminal can itself be in the form of a cellular telephone with an application ("applet," "app") that is stored and running on it for this purpose. In cases in which the second network system is a social real-time collaboration system, the connection equipment can be a data processing device with an appropriate software interface.

In general, the connection equipment can be provided in the form of a hardware system that is expanded if applicable by a hardware or software plug-in.

Embodiments of the method moreover preferably provides that, in cases in which the first network system is a unified communication system or a social real-time collaboration system, the user status is ascertained by a software plug-in that is stored and running on the data processing device of the first network system, and sent out to the connection equipment of the second network system. In cases in which the first network system is a cellular network system, the user status is ascertained by an application on the cellular telephone as the first telecommunication terminal and sent out to the connection equipment of the second network system. In cases in which the first network system is a telephone switchboard, the operation status is ascertained by a server unit on the telephone switchboard or a proxy server, which is connected to the telephone switchboard and sent out to the connection equipment of the second network system.

Transmission of the use status preferably occurs at least whenever that status changes. Alternatively or more preferably, the use status is transmitted again and on an ongoing basis at rather short intervals (for example at time intervals between 0.1 and 3 seconds, preferably at intervals between 0.5 and 2 seconds).

Preferably, when a communication connection is established between the first telecommunication terminal and an additional telecommunication terminal, and/or during the process of establishing such a communication connection, the use status "busy" is transmitted to the connection equipment of the second network system, and a busy signal is displayed to the third telecommunication terminal. In general, the use status may also be: "In calling state" (i.e., call not yet answered), "on telephone call" or "in teleconference" (if this is the case) or "answered" (the latter three statements as differentiation from simply "busy"), "just hung up," "available" and the like.

In other words, a) when establishing a communication connection between the first telecommunication terminal and another telecommunication terminal, a use status "calling" transmits a corresponding indication to the connection equipment of the second network system and a corresponding acoustic or visual or haptically ascertainable signal is displayed or issued on or by the third telecommunication terminal, and/or b) when a communication connection exists between the first telecommunication terminal and another telecommunication terminal, a use status indication of "busy," "on telephone call," "in teleconference" or "receiver hung up" is correspondingly transmitted to the connection equipment of the second network system, and a corresponding acoustic or visual or haptically ascertainable signal is issued to the third telecommunication terminal, and/or c) during the end and for a predefined time period after the end of a communication connection between the first telecommunication terminal and another telecommunication terminal, a use status indication of "hung up" is correspondingly transmitted to the connection equipment of the second network system and a corresponding acoustic or visual or haptically ascertainable signal is issued to the third telecommunication terminal, and/or d) after the predefined time period elapses after the end of a communication connection between the first telecommunication terminal and another telecommunication terminal and when no such connection is being established or exists, the use status indication of "available" is correspondingly transmitted to the connection equipment of the second network system and a corresponding acoustic or visual or haptically ascertainable signal is issued to the third telecommunication terminal.

Embodiments of the invented telecommunications apparatus in accordance with the first aspect, which is accomplished preferably as a telecommunication terminal and is designed for operation in a first network system, in which a first network technology is applied, has a data processing device on which a computer program is stored, and that program, when in operation (that is, when it is running, particularly in a working memory [RAM]), via execution by a processor can result in the telecommunications apparatus being configured to:

a) determine a use status of the communication apparatus and furthermore is designed to transmit the use status to a device in a second network system which uses a second network technology that differs from the first network technology, and/or b) receive data indicating the use status of another telecommunication apparatus, particularly another telecommunication device from a second network system in which a second network technology is used that differs from the first network technology, and is additionally designed, when receiving a communication activity from a third telecommunication apparatus, particularly a telecommunication terminal, defines a communication response based on the received data and issues it to the third telecommunication apparatus.

In an additional aspect associated with the telecommunication apparatus, data are provided for a computer program, particularly a software application, which are interpreted, when saving data on a data processing device of a telecommunication apparatus in a network system in which a first network technology is in use, and if the computer program is activated, a) to cause the use status of the telecommunication apparatus to be ascertained and transmitted to another telecommunication apparatus in a second network system, in which a second network technology is in use that differs from the first network technology, and/or b) to cause data to be received that indicate the use status of another telecommunication apparatus from a second network system in which a second network technology is used that differs from the first network technology, and when communication activity is received from a third telecommunication apparatus, to cause a communication response to be defined based on the received data and issued to the third telecommunication apparatus.

According to another aspect of the invention, a telecommunication device, particularly a telecommunication terminal, is provided which is designed for operation in a first network system in which a first network technology is applied, with a data processing unit, on which a computer program is stored, that (when activated) is designed to cause data to be received indicating that a communication activity is occurring via a first other communication apparatus, to create or to end a communication connection to a second other communication apparatus, or to include at least a fourth communication apparatus in an existing communication connection, and, particularly when a communication connection exists to a fifth telecommunications apparatus, to generate, via an output device of the telecommunication apparatus, an output that is determined (particularly determination of the type and time of the output) based on the received data.

Related to this aspect of the telecommunication apparatus, a computer program product is provided with data for a computer program, particularly a software application, which is designed, when storing the data on a data processing device of a telecommunication apparatus in a network system using a first network technology, and when activated, to cause data to be received which indicate that a communication activity is occurring via a first other communication apparatus, in order to create or to end a communication connection to a second other communication apparatus, or at least to include a fourth communication apparatus in an existing communication connection, and particularly when a communication connection to a fifth data apparatus exists, to further cause an output to be generated on an output device of the telecommunication apparatus, with said output determined based on the received data.

A computer program product in terms of the present application is considered to be any medium that is capable of providing data for a computer program to store and process accordingly so that the data can be read (e.g. a non-transitory medium, a non-transitory memory, etc.).

Other details, objects, and advantages of the telecommunications apparatus method will become apparent as the following description of certain exemplary embodiments thereof proceeds.

BRIEF DESCRIPTION OF THE DRAWINGS

Preferred embodiments of the invention are described in detail with reference to the drawing, in which.

DETAILED DESCRIPTION OF EXEMPLARY EMBODIMENTS

Figure 1:
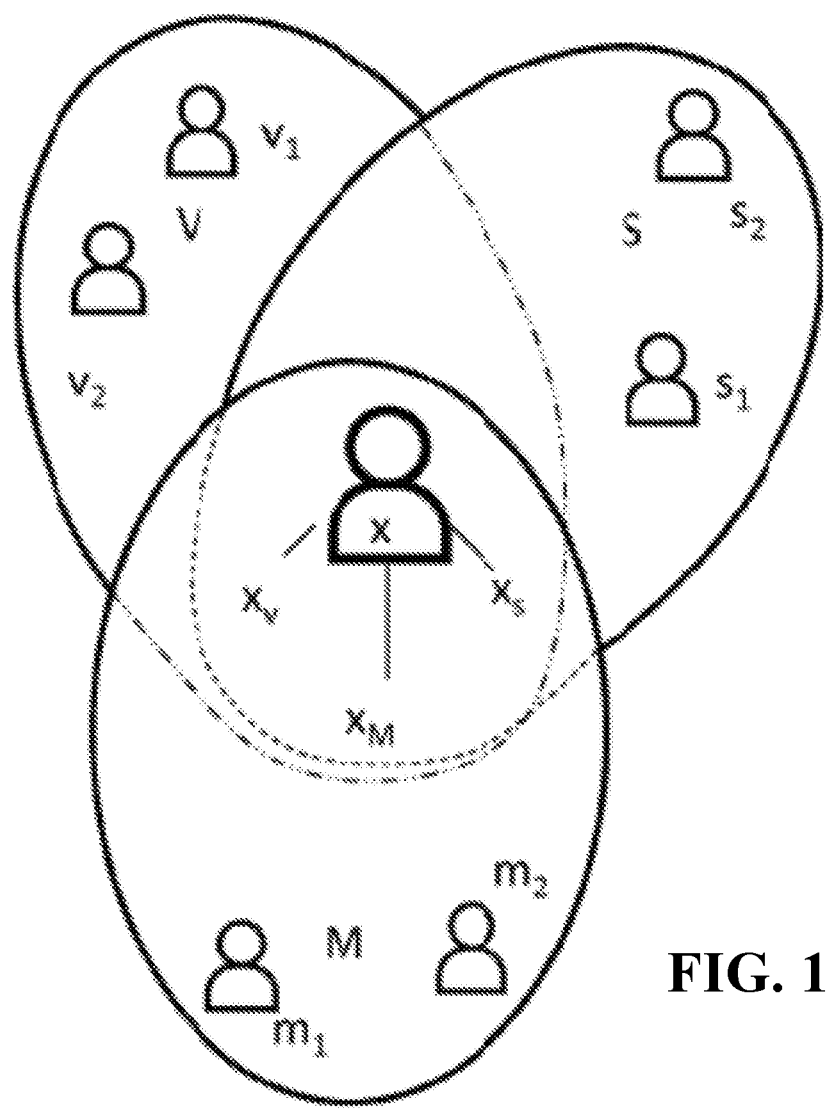
FIG. 1 shows an overview of three domains, in which one user uses one telecommunication terminal at a time.

A user X shown in FIG. 1 uses a terminal $X_V$ in a unified communication system (unified communication domain) V, for example, a desk telephone in a telephone network. Other users have available additional telecommunication terminals $v_1$, $v_2$ in the unified communication system. User X also uses a cellular telephone $X_M$ in a cellular network M, in which there are additional users with telecommunication terminals $m_1$ and $m_2$. User X finally also uses a social real-time collaboration system S, for example the "Circuit®" system of the applicant, where there are additional participants with telecommunication terminals $s_1$ and $s_2$.

The individual network systems V, M and S can also be called "domains" because they use different network technologies and can only be connected to each other via interfaces. The network technology concerns in particular the types of signals and the types of their delivery and transmission.

Figure 2:
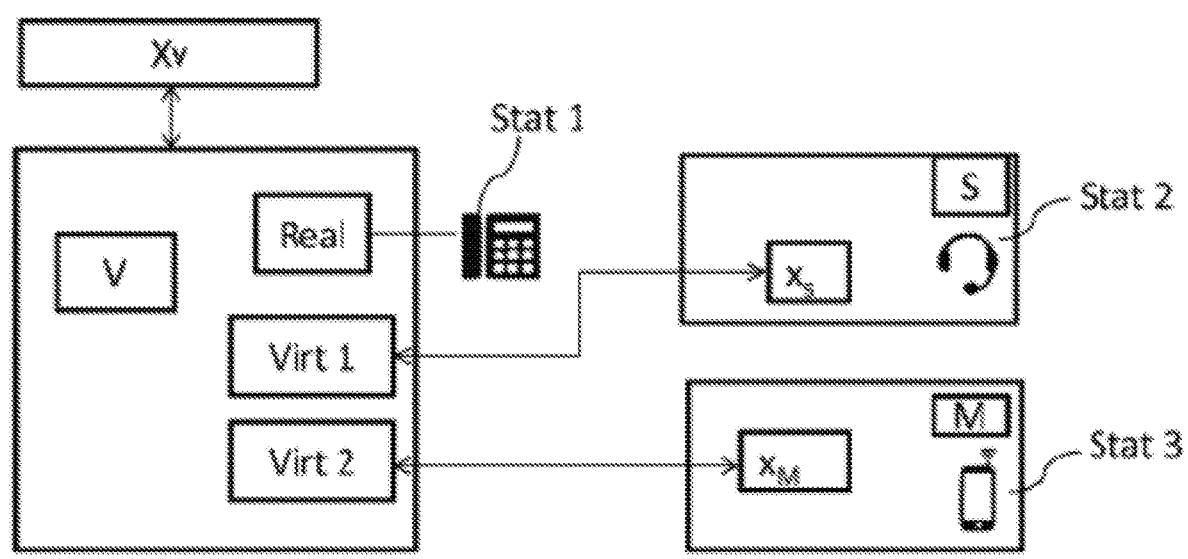
FIG. 2 illustrates terminals from one user connected together, as is achieved in the prior art.

Until now, as shown in FIG. 2 for the prior art, other telecommunication devices outside of a unified communication system V are represented in it by virtual devices $Virt_1$ and $Virt_2$, which are connected loosely via the configured telephone number with the other network systems S and M. The real (physical) apparatus in the unified communication system, such as the desk telephone, is directly connected to a corresponding control unit Real. A status Stat1 of the user state indicates, for example, that the desk telephone is not being used. However, it may be that the user is using his terminal $X_s$ in the social real-time collaboration system S, so that the status Stat2 indicates that the subscriber is busy. In the cellular network M, the final subscriber $X_M$ is identified by the status Stat3, which likewise indicates that the user is available.

Although the user according to Stat2 is conducting a telephone call at that moment or is otherwise in a communication connection, this is not visible for a call to the desk telephone, because Stat1 does not show a busy signal. Also, for a caller to the cellular phone, it is not recognizable according to Stat3 that the subscriber cannot immediately take a phone call.

Figure 3:
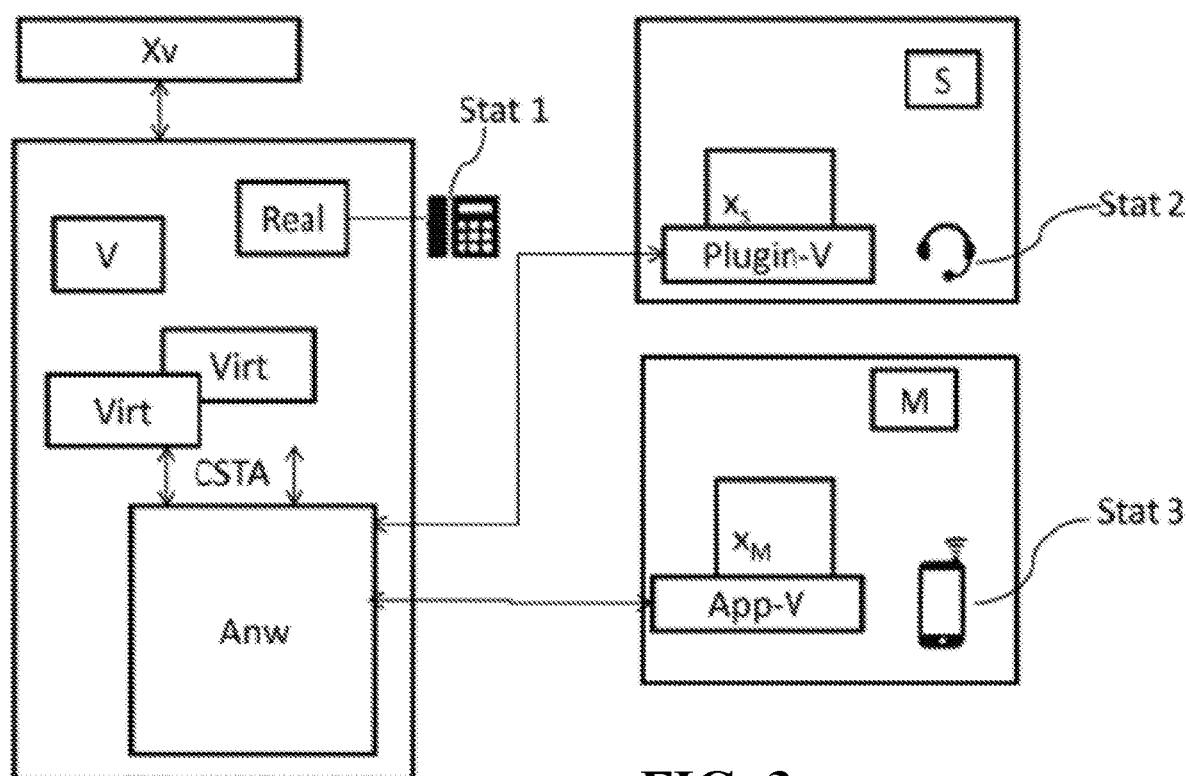
FIG. 3 shows a connection of communication terminals according to an exemplary embodiment of the invention, as is achieved in one exemplary aspect according to the invention.

In contrast, according to an exemplary embodiment of the invention, as shown in FIG. 3:

An application Anw is running on the unified communication system V that collaborates with corresponding software on the other network systems, namely with a Plugin-V on the social real-time collaboration system and with an App-V on the cellular telephone.

If the user is having a conversation on the social real-time collaboration system S, so that the status Stat2 corresponds to a busy state, then by the transmission of Plugin-V and the application Anw via the corresponding virtual apparatus Virt in the unified communication system, the status Stat1 is also set to busy on the desk telephone, just like the status Stat3 of the cellular telephone $X_M$ is set to "busy" via the application Anw and the App-V. It is therefore possible to transmit the use status of a telecommunication terminal of a user to another telecommunication terminal of the same user or at any rate for this one status to influence any other status. What is explained here as the example for the same telecommunication terminal of an individual user can apply to any given group of centralized telecommunication terminals in different network systems (domains). A network system- or domain-crossing synchronization of the use states Stat1, Stat2 and Stat3, etc. is thereby achieved. In addition to a busy state, the information of when the user last used his telecommunication terminal can also not only be provided to this telecommunication terminal itself, but also transmitted to other telecommunication terminals. In addition, absence information ("in meeting until . . . " or "on vacation, returning on . . . ") can be entered and adjusted on a device and received by the other devices through the assigned synchronization.

It is also possible to synchronize a list of last-achieved communication connections across the network system.

Embodiments of the invention can be configured for accomplishing a new service in the CSTA ("Computer Supported Telephony Application"), which primarily occurs with the starting of the "ServiceInitiated" function and the ending of the "ConnectionCleared" communication. The status exchange occurs between the Plugin-V and the application Anw, between the application Anw and the App-V, or also via the application Anw between the Plugin-V and the App-V. In this way it is possible, when telephoning or otherwise communicating in the social real-time collaboration system in the unified communication system and cellular network, to indicate a busy signal or end its display when the communication in the social real-time collaboration system is ended. Likewise, a telephone call via cellular telephone $X_M$ can also indicate a busy signal if a third subscriber calls the desk telephone. On the other hand, a status exchange can also occur via nodes within the server for unified communication.

A user is then displayed as being in a communication any time he is communicating on any of his telecommunications terminals $X_V$, $X_S$ and $X_M$, even when a call for communication or a telephone call occurs on one of the other telecommunication terminals.

From a state of non-communication ("null"), the state can be maintained and changed to any other state. For example, if the state changes to "initiated," then this state can be followed by being maintained, by a call ("alerting"), by the indication of a failed attempt ("failed") or by the indication that the call is currently on hold ("queued"). Following initiation, the connection state can also be created. Following a wake-up call, a failed attempt can be indicated, "queuing" can occur, or the connection state can be captured. Following the queuing state, it can change to the connection state and vice versa. In addition, from the connection status and based on queuing status, it can change to a hold state. The hold state ends either in a failed attempt, from which he is also reachable, or a call ("alerting") or the return to the "null" state occurs.

This is based on the explanation of the connection state model in accordance with ECMA-269 (European association for standardizing information and communication systems) as on the Internet under https://www.ecma-international.org/publications/standards/Ecma-269.htm retrievable on 22 Feb. 2017).

The state variable can be called the LocalConnectionState. The transition takes place within this variable LocalConnectionState.

Next the service "Set_Busy in Conversation" will be explained. The service "SetBusy_In Conversation" makes available two functions. With the function query (Service Request) "SetBusyIn ConversationRequest," the parameter device is assigned from the parameter type DeviceID to any telecommunication terminal, which should have the same use state as any other telecommunication terminal or a proxy device of the same user. The variable calledDevice from the parameter type CalledDeviceID describes the apparatus called and is then defined, for example, if the initiation of the variable LocalConnectionState occurs. The variable alertingDevice from the parameter type SubjectDeviceID names the apparatus on which the wake-up call occurs, i.e., the parameter is defined when the state LocalConnectionState should be wake-up call. Other variables of the type . . . DeviceID can be provided to describe further apparatuses that are known from ECMA-269 and provide more detailed information regarding a connection and the associated transition query of the LocalConnectionState. The variable localConnectionInfo from the variable type LocalConnectionState indicates the transition in the connection status of the devices indicated by the variable device, wherein the variable is replaced by "n" in the state "null," by "i" in the state "initiated," by "a" in the state of a wake-up call, by "c" in the state "connected," by "q" in the state "queued," by "h" in the state "hold" and by "f" in the state "failed" for a failed attempt. The variable reason of the type EventCause states the reason why the connection changed. Possible values are found in the ECMA-269 Specifications. Additional information can indicate call characteristics such as CallCharacteristics, ServicesPermitted and LocationInfo, for example. Security is the variable of the type CSTASecurityData, that states information on time, the number of the message sequence and security information. The variable privateData of type CSTAPrivateData is non-standardized information.

For positive confirmation of the functional response (service response) "SetBusyInConversationResult," there is a parameter connection of the type ConnectionID, which states how the connection appears. In ECMA-269 there is more detail, such as see initiatedConnection, originatedConnection, establishedConnection. A deviating check-back signal can be the variable callLinkageData of the type CallLinkageData, which describes all call data and particularly the data of the calling sequence ("thread") that accompanies the call. Even more precise information such as CallLinkageDataList is also possible. The variable security of the type CSTASecurityData and the variable privateData of the type CSTASecurityData correspond to the above-named variables.

If a transition to the use state, i.e., initiation, occurs, then the connection D1C1 (calling device) must be generated based on the starting state of "null" or "initiated," and the final state must be "initiated."

To monitor the process sequences in regard to the apparatus type, the monitored apparatus can be the telecommunication terminal D1 (calling apparatus), the connection can be D1C1, the process can be the one initiating the function, and the cause can be that a call is generated or a new call ("new call") is received. This can also be the normal state, particularly if initiation has been caused.

If the call C1 is monitored, the connection D1C1 is registered and the function is either initiated (cause: call generated or new call) or optionally induced (new call or normal).

During the transition in the use status for the purpose of the call ("alerting"), the basis for the connection D1C1 is the native state "null" and the final state is "alerting," which is ringing for a telephone or entering into a mode of distributing the incoming information into a local network.

To monitor D1 (the waking apparatus) or C1 in the connection D1C1, the indicated process can be the transmission of the signal ("delivered") and the indicated cause for the process can be that, through a new call ("new call"), it involves a normal state or entry into the data distributor.

Further examples for the transition of the use status are the native mode or the advanced mode. In the native mode, the transmission of messages is treated as being done by two independent calls (to the native apparatus and the target apparatus). In the advanced mode, the native apparatus and the target apparatus are handled through the same call, as though the native apparatus had directly called the target apparatus. This is achieved via a middleware component (application) that accesses the proxy apparatus and depicts the information from the two independent calls by the native model as one single call. Techniques such as those known from EP 2 875 627 B1 are used. In the starting example, all applications can synchronize themselves using conventional targeting services ("gate services") such as "Snapshot Device" and "CallControlEvents" from ECMA-269. This provides backwards compatibility.

If the native apparatus $X_V$ in the unified communication system V is set to the state "in communication" or "busy" by activity on the proxy apparatus, there are two options for how the processing of the call on the native apparatus $X_V$ is handled:

a) parallel calls are enabled; they are treated as independent calls, b) parallel calls are declined, and further activities are defined by configuring the platform or defining an extra indication in the function query "SetBusyInConversationRequest": The parameter parallelCall of the Boolean type is defined. It will be set to "true" if a parallel call is allowed and set to "false" if a parallel call is declined.

The known PBX function of call waiting ("camp-on") can be implemented with the acceptance of a parallel call.

The manner in which the above-described CSTA function parameters can be implemented will be explained below, using examples based on FIGS. 4-6.

Figure 4:
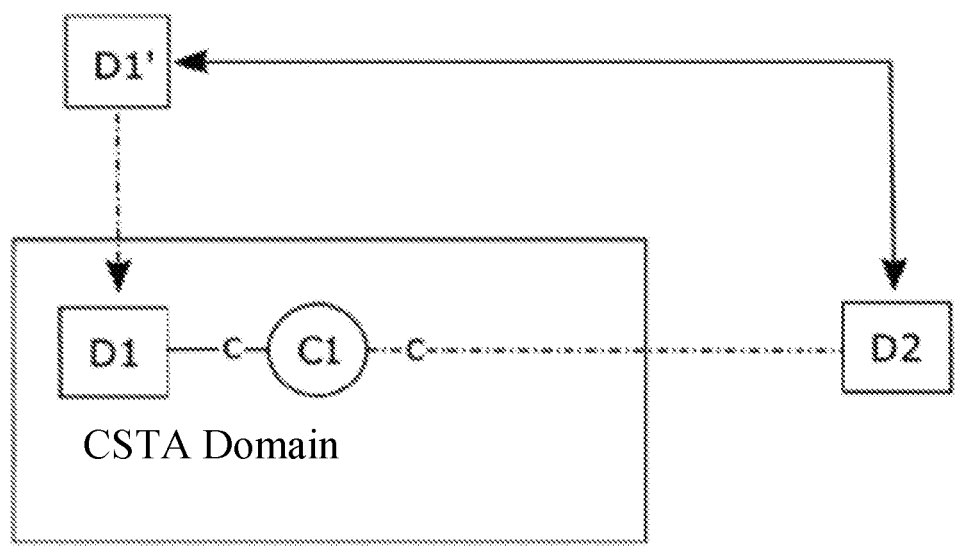
FIG. 4 illustrates an embodiment of connected states between different telecommunication terminals.
Figure 5:
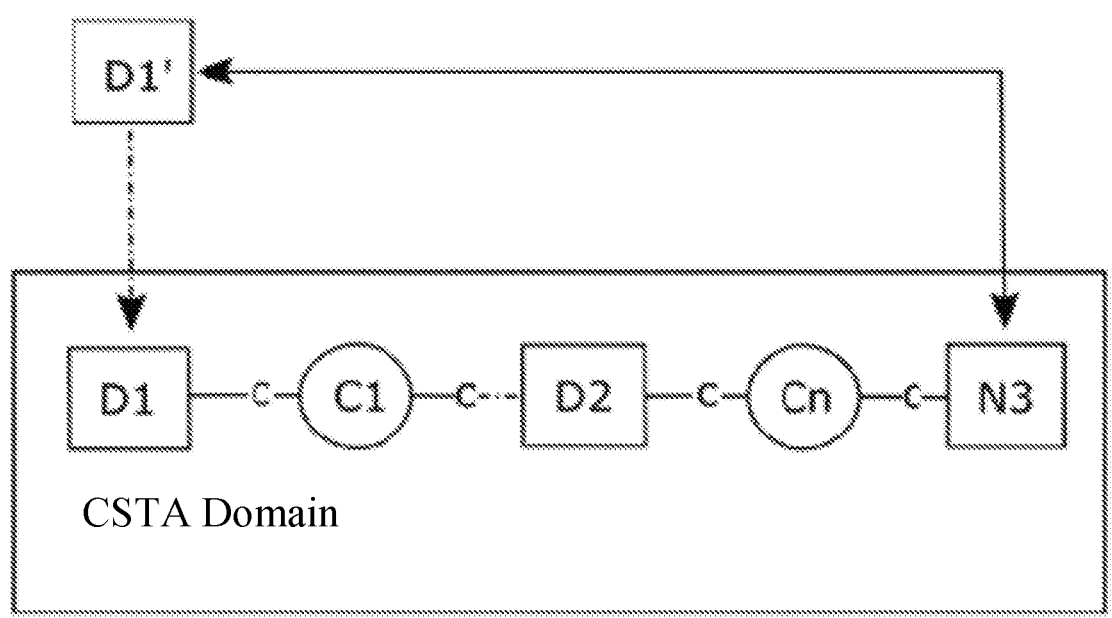
FIG. 5 illustrates an embodiment of connected states between different telecommunication terminals.
Figure 6:
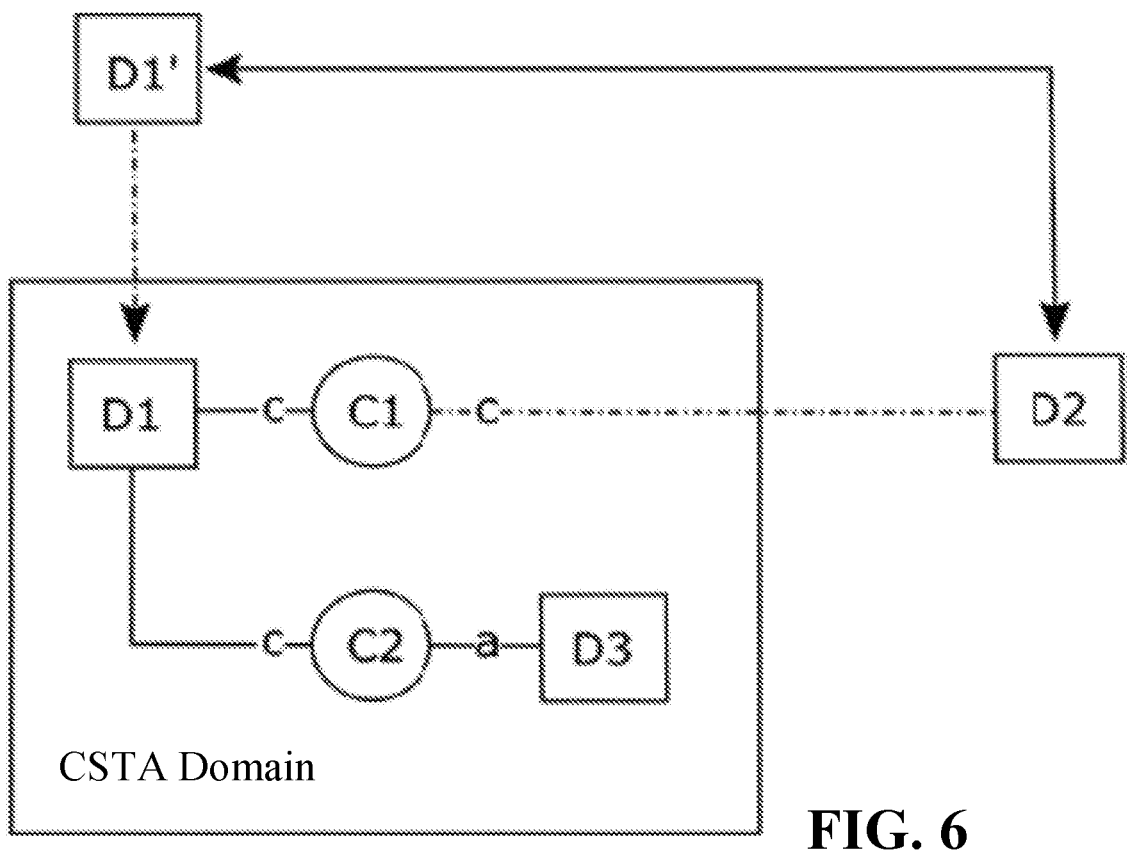
FIG. 6 illustrates an embodiment of connected states between different telecommunication terminals.

In FIGS. 4-6, the individual telecommunication terminals of a user are called D1 and D1'. D1 can be any of the devices $X_M$, $X_V$ and $X_S$. D1' can be any of the respective other devices. D2 is a telecommunication device of another subscriber.

Based on FIG. 4, we are assuming a CSTA domain (CSTA network system) in which the telecommunication terminal D1 is located. The same user has a second telecommunication terminal D1'. Another user has the telecommunication terminal D2. In the present case, the user calls the telecommunication terminal D2 using his telecommunication terminal D1'. The subsequently described function should cause the native apparatus D1 within the CSTA domain to be set to the busy state ("busy in conversation") and issue corresponding signal outputs during a call. The function "SetBusyInConversationRequest" includes that the variable device is set to the value D1 and the variable calledDevice is set to D2. However, this is only optional, because it is necessary to know with whom the user is currently on a telephone call via D1' only for the synchronization of the call lists, but not for the use state as such. The variable localConnectionInfo is set to initiated.

In response to this activity on the part of the telecommunication terminal D1', there is a confirmation ("acknowledgment") via the function "SetBusyInConversationResult." The function "SetBusyInConversationResult" includes that the variable connection was set to the value D1C1. It is then followed by the function ServiceInitiatedEvent with the variables initiatedConnection and the value D1C1 (identical to the value from the function "SetBusyInConversationResult"), the variable initiatingDevice and the value D1 (identical to the value from the function SetBusyInConversationRequest), the variable locatedConnectionInfo and the value initiated (likewise identical to the value from the function "SetBusyInConversationRequest") and the cause, specified as "new call." Should the service Set_Busy in Conversation show further call generation after the connection is initiated, the variable callDirectoryNumber changes to D2 and the variable locatedConnectionInfo to the value "connected." This is entirely optional. It is followed again by a confirmation (see above).

The function OriginatedEvent then has the variables originatedConnection with the value D1C1, callingDevice with the value D1, calledDevice with the value D2, localConnectionInfo with the value "connected" and the cause "new call."

When the called telecommunication terminal D1 begins to ring, naturally the telecommunication terminal D1' receives a response (ring tone). However, this response can also be given by telecommunication terminal D1 using the service "Set_Busy in Conversation" and the above applicable embodiments, if the variable "alertingDevice" is set to connected. This is entirely optional.

In this case, the function DeliveredEvent has the value D2C1 for the variable connection, the value D2 for the variable alerting Device, the value D1 for the variable callingDevice, the value D2 for the variable calledDevice, the value NR for the variable lastRedirectionDevice, the value "connected" for the variable localConnectionInfo, for the cause "new call."

If the subscriber on telecommunication terminal D2 picks up, alternatively to the above embodiments, he can also manually set the variable answeringDevice to connected using the service "Set_Busy in Conversation."

This runs the function EstablishedEvent with the variable establishedConnection that has the value D2C1, answeringDevice with the value D2, calling Device with the value D1, calledDevice with the value D2, lastRedirectionDevice with the value NR, localConnectionInfo with the value "connected" and the cause is "new call."

FIG. 4 describes what happened previously if the telecommunication terminal D2 was located outside of the CSTA domain.

FIG. 5 shows the situation if D2 is now part of the CSTA domain. The call via the telecommunication terminal D1' enters via the network trunk apparatus N3 into the CSTA domain and is transmitted via the call Cn.

The function "SetBusyInConversationRequest" appears as described above. The confirmation "SetBusyInConversationResult" also appears as described above. In addition, the function ServiceInitiatedEvent is executed as described above. However, the same values are assigned for the monitoring apparatus N3 as for the telecommunication terminal D1.

The function OriginatedEvent is of interest here. Based on the service "Set_Busy in Conversation" in the area of the telecommunication terminal D1, the values of the variables are [set] to DC1 for the originatedConnection, D1 for callingDevice, D2 for calledDevice, "connected" for localConnectionInfo and "new call" for the cause. In contrast, in the area of the apparatus N3, the values are set as follows: For the variable originatedConnection to N3Cn, for callingDevice to D1, for called Device to D2, for localConnectionInfo to "connected" and for the cause "new call." In addition, a further variable associatedCallingDevice is set to the value N3.

As soon as the ring tone is issued in the telecommunication terminal D2, and D1 should receive a corresponding response using the service "Set_Busy in Conversation," the variables for the function DeliveredEvent by D1 are set as follows: connection to D2C1, alertingDevice to D2, callingDevice to D1, calledDevice to D2, lastRedirectionDevice to NR, localConnectionInfo to "connected" and the cause to "new call." Otherwise the variables are set in the area of the apparatus N3 and the telecommunication terminal C2. Set concurrently for N3 and C2 are: connection to D2Cn, alertingDevice to D2, calling Device to D1', lastRedirectionDevice to NR, localConnectionInfo to "connected" and the cause to "new call."

When picking up the telecommunication terminal, using the service "Set_Busy in Conversation" the values are set as follows: For the telecommunication terminal D1 the function EstablishedEvent is implemented by the variable establishedConnection with the value D2C1, the variable answeringDevice with the value D2, the variable calling Device with the value D1, calledDevice with the value D2, lastRedirectionDevice with the value NR, localConnectionInfo with the value "connected" and the cause is "new call." In the area of apparatus N3, the variables read: establishedConnection D2Cn, answeringDevice D2, callingDevice D1', calledDevice D2, lastRedirectionDevice NR, localConnectionInfo "connected" and the cause is "new call." Differently from D1, the variable callingDevice is set to D1' instead of D1.

In the area of the telecommunications terminal D2, the variables are set the same as in telecommunication terminal D1.

As a variation from what is described above, the information about the call Cn can be concealed. The variables are then set overall as described above, only there is no special variable set for the apparatus N3.

In addition, based on FIG. 4, there is also an explanation below of what happens if the user receives a call from apparatus D2 on his telecommunication terminal D1' and if the device D1 is changed to "busy." (The calling direction is thus described reversed from the above using FIG. 4. The "call journal" shows the devices for the open call, call initiation on the primary device.)

The implementation of the function "SetBusyInConversationRequest" includes setting the variable device to D1, the variable callingDevice to D2, the variable localConnection to "Alerting." A confirmation ("acknowledgment") occurs in the function "SetBusyInConversationRes(ult)," during which the variable connection is set to D1C1.

As soon as the telecommunication terminal D1' starts to send a ring tone out and the telecommunication terminal D2 receives this ring tone, the service "Set_Busy in Conversation," as part of the function DeliveredEvent for D1, sets the variable connection to D1C1, the variable alertingDevice to D1, callingDevice to D2, calledDevice to D2, lastRedirectionDevice to NR, localConnectionInfo to Alerting (call) and cause to "new call." Based on the situation in FIG. 4, the following will explain in more detail what happens if the use state of being busy ("in conversation . . . " or "busy in a call with . . . ") is ended (by one subscriber hanging up). In this case, based on the use status of being busy, the service "Set_Busy_in_Conversation" is transmitted for the telecommunication terminal D1. The function "SetBusyInConversationRequest" includes that the variable device is set to D1, connection to D1C1 and localConnectionInfo to null. The confirmation occurs as "SetBusyInConversationRes(ult)" with the variable connection at the value D1C1. The telecommunication terminal D1 is afterwards idle. This is identified by the function ConnectionClearedEvent, which sets the variable droppedConnection to D1C1, the variable releasingDevice to D1, the variable localConnectionInfo to null and the variable cause to normal, "normal clearing" (ending of the call).

Further call control functions such a callback, call waiting, teleconference, query, call forwarding, recording, holding, "intrusion" (intervening in an ongoing conversation), parking, reconnecting, re-recording and connection are implemented according to the functions "localConnectionState," "deviceID" and "connectionID," as specified in the ECMA-269 specification.

In FIG. 4, a small c for "connected" is indicated as the variable between D1 and C1. Using the service "SnapshotDevice," synchronization can take place at telecommunications terminal D1. In the function "SnapshotDeviceRequest," the variable snapshotObject is set to D1, and for confirmation in the function "SnapshotDeviceRequest," the variable snapshotData is set to D1C1, where n, i, a, c, q, h, f is then defined depending on the current use state.

The following description refers to FIG. 6 and concerns the case of parallel calls: The user is found with his telecommunication terminal D1 on a call through one of his additional proxy devices D1' and the telecommunication terminal D2. As described above, the telecommunication terminal D1 is put into the busy state using the service "SetBusy in a conversation." For the monitored telecommunication terminal D1, the function EstablishedEvent sets the variable establishedConnection to D2C1, answeringDevice to D2, callingDevice to D1, calledDevice to D2, lastRedirectionDevice to NR, localConnectionInfo to "connected" and the variable for the cause, to "new call."

What happens now if a call with a further telecommunication terminal D3 is allowed to be executed? This means that the variable for the definition of parallel calls has received the value "true." The function "SetBusyInConversationRequest" sets the variable device to D1, the variable answeringDevice to D2, localConnectionInfo to "connected" and the variable "parallelCall" to "true." The function "SetBusyInConversationResult," which sets the variable connection to D1C1, is used for confirmation. If there is now a call by telecommunication terminal D1 to telecommunication terminal D3, the function ServiceInitiatedEvent sets the variable initiatedConnection to D1C2, initiatingDevice to D1, localConnectionInfo to "initiated" and the variable cause to "new call." The function OriginatedEvent sets the variable originatedConnection to D1C2, callingDevice to D1, calledDevice to D3, localConnectionInfo to "connected" and the cause to "new call."

Finally the function DeliveredEvent sets the variables not only for the monitored telecommunication terminal D1 but also for the monitored telecommunication terminal D3. The function "DeliveredEvent" sets connection to D3C2, alertingDevice to D3, callingDevice to D1, calledDevice to D3, lastRedirectionDevice to NR. The variable localConnectionInfo is set to "connected" for the telecommunication terminal D1, to "Alerting" (calling) for the telecommunication terminal D3. In both cases, "new call" is specified as the cause.

It should be appreciated that while certain exemplary embodiments of a telecommunications apparatus, telecommunications terminal, non-transitory computer readable medium, and methods of making and using the same have been shown and described above, it is to be distinctly understood that the invention is not limited thereto but may be otherwise variously embodied and practiced within the scope of the following claims.

The invention claimed is:

1. A method for operating a communication system that has a group of telecommunication terminals as well as additional telecommunication wherein the group has a first telecommunication terminal that can be operated using a first network technology in a first network system, and a second telecommunication terminal that can be operated using a second network technology in a second network system, wherein the second network technology is different from the first network technology and the first network system and the second network system can be connected to each other via a network interface apparatus, the method comprising:

transmitting a use status of the first telecommunication terminal to connection equipment while the connection equipment is facilitating a communication connection between a third telecommunication terminal outside of the group and the second telecommunication terminal or to end such a communication connection, or to expand the communication connection to another subscriber, the connection equipment issuing a communication response, defined based on the transmitted use status of the first telecommunication terminal, to the third telecommunication terminal and/or causes a reaction by the second telecommunication terminal depending on the transmitted use status of the first telecommunication terminal.

2. The method of claim 1, wherein the network interface apparatus, is a gateway and each telecommunication terminal is comprised of a processor connected to a non-transitory computer readable medium.

3. The method of claim 1, wherein the first network system and the second network system are two different networks from a group of network systems consisting of:
a) a unified communication system (V), which connects telecommunication terminals in a uniform application environment,
b) a cellular network (M),
c) a telephone switchboard, in particular a private branch exchange or private automatic branch exchange system, and
d) a social real-time collaboration system (S).

4. The method of claim 2, wherein:
if the second network system is a telephone switchboard, the connection equipment is a proxy server or a server assigned for communication connections, and
if the second network system is a cellular network, the connection equipment includes a cellular telephone with an application stored and running on it, and
if the second network system is a social real-time collaboration system, the connection equipment is a data processing unit with a software interface.

5. The method of claim 3, wherein:
if the first network system is a unified communication system or a social real-time collaboration system, the user status is determined by a software plugin that is stored and running on a data processing unit on the first network system and is sent out to the connection equipment of the second network system;
if the first network system is a cellular network system, the use status is determined by an application on a cellular telephone as the first telecommunication terminal; and
if the first network system is a telephone system, the use status is determined by a server unit of the telephone switchboard or a proxy server that is connected to the telephone switchboard and sent out to the connection equipment of the second network system.

6. The method of claim 1, wherein the use status is transmitted at least with every change of the use status.

7. The method of claim 1, wherein the use status is transmitted at least with every change of the use status, continuously and/or repeatedly.

8. The method of claim 1, wherein:
a) when establishing a communication connection between the first telecommunication terminal and another telecommunication terminal, a use status indicating a status of "calling" is transmitted to the connection equipment of the second network system and a corresponding acoustic or visual or haptically ascertainable signal is displayed or issued to the third telecommunication terminal, and/or
b) when a communication connection exists between the first telecommunication terminal and another telecommunication terminal, a use status indication of "busy," "on telephone call," "in teleconference" or "receiver hung up" is transmitted to the connection equipment, and a corresponding acoustic or visual or haptically ascertainable signal is issued to the third telecommunication terminal, and/or
c) during and for a predefined time period after the end of a communication connection between the first telecommunication terminal and another telecommunication terminal, a use status indication of "hung up" is transmitted to the connection equipment and a corresponding acoustic or visual or haptically ascertainable signal is issued to the third telecommunication terminal, and/or
d) after the predefined time period elapses after the end of a communication connection between the first telecommunication terminal and another telecommunication terminal and when such a connection neither exists nor is being established, the use status indication of "available" is transmitted to the connection equipment and a corresponding acoustic or visual or haptically ascertainable signal is issued to the third telecommunication terminal.

9. A telecommunication apparatus designed for operating in a first network system in which a first network technology is used with a data processing unit having a non-transitory computer readable medium on which a computer program is stored that, when activated
   a) determines a use status of the communication apparatus and is designed to transmit the use status to an apparatus in a second network system using a second network technology that differs from the first network technology, and/or
   b) receives data indicating the use status of another telecommunication apparatus from a second network system using a second technology that differs from the first network technology, and when entering into a communication activity to or from a third telecommunication apparatus, defines a communication response based on the received data and sends it to the third telecommunication apparatus.

10. The telecommunication apparatus of claim 9, wherein the telecommunication apparatus is a communication terminal.

11. A non-transitory computer readable medium having a program stored thereon such that when code of the program is processed by a data processing device of a telecommunication apparatus in a network system using a first network technology, the telecommunication apparatus performs a method comprising:
   a) causing a user status of the telecommunication apparatus to be ascertained and transmitted to another telecommunication apparatus in a second network system, in which a second network technology is in use that differs from the first network technology, and/or
   b) causing data to be received indicating the use status of another telecommunication apparatus from a second network system using a second network technology that differs from the first network technology, and, upon entry into a communication activity to or from a third telecommunication apparatus, to cause a communication response to be defined based on the received data and issued to the third telecommunication apparatus.

12. The non-transitory computer readable medium of claim 11, wherein the method is configured so that, in response to receiving data indicating that a communication activity is occurring through a first other communication apparatus to create or to end a communication connection to a second other communication apparatus, or to include a fourth communication apparatus in an existing communication connection when a communication connection to a fifth communication apparatus exists, to create an output based on the received data and generate it via an output device of the telecommunication apparatus.

* * * * *